United States Patent [19]

Weigand et al.

[11] Patent Number: 4,588,032

[45] Date of Patent: May 13, 1986

[54] FLUID SPACER COMPOSITION FOR USE IN WELL CEMENTING

[75] Inventors: Willis A. Weigand; Patty L. Totten, both of Duncan, Okla.

[73] Assignee: Halliburton Company, Duncan, Okla.

[21] Appl. No.: 705,425

[22] Filed: Aug. 9, 1984

[51] Int. Cl.$^4$ .............................................. E21B 33/16
[52] U.S. Cl. .................................. 166/291; 252/8.55 R
[58] Field of Search ...................... 252/8.55 R, 8.5 P; 166/291

[56] References Cited

U.S. PATENT DOCUMENTS

| | | | |
|---|---|---|---|
| 2,851,105 | 9/1958 | Garst | 252/8.55 |
| 3,455,386 | 7/1969 | Reisberg | 252/8.55 X |
| 3,849,316 | 11/1974 | Motley et al. | 166/291 X |
| 4,124,075 | 11/1978 | Messenger | 166/291 X |
| 4,190,110 | 2/1980 | Beirute | 252/8.55 X |
| 4,223,732 | 9/1980 | Carriay et al. | 166/291 |
| 4,304,300 | 12/1981 | Watson | 252/8.55 |

*Primary Examiner*—Herbert B. Guynn
*Attorney, Agent, or Firm*—Robert A. Kent; Thomas R. Weaver

[57] ABSTRACT

The present invention relates to an aqueous composition and method for substantially preventing contact between non-compatible hydrocarbonaceous and aqueous fluids employing an aqueous spacer composition. The composition comprises an aqueous fluid, an admixture of nonylphenols and, preferably, at least one member selected from the group of a sulfonated linear $C_8$ to $C_{18}$ straight chain alcohol ethoxylated with an average of from about 2 to about 20 moles of ethylene oxide, a low molecular weight aliphatic glycol ether containing from about 3 to about 12 carbon atoms and an alcohol containing from about 3 to about 8 carbon atoms ethoxylated with an average of 2 to 4 moles of ethylene oxide.

16 Claims, No Drawings

FLUID SPACER COMPOSITION FOR USE IN WELL CEMENTING

BACKGROUND OF THE INVENTION

It is often desirable to separate or prevent contact between particulate solid containing carbonaceous and aqueous liquids. For example, drilling fluids (often referred to as "muds") are normally present in oil and other similar wells at the time of cementing a casing into a borehole with an aqueous cement slurry. The mud and cement are not always compatible with each other. The incompatibility of an aqueous cement slurry with an oil based mud can be of such severity that a mixture of the two will form an unpumpable mass. When this happens in a borehole, the cement slurry cannot be pumped or displaced. Casing, tubing or drill pipe will be left full of set cement which require costly drilling out or in some cases develops into a situation that cannot be corrected. In the latter instance, a costly oil, or other similar well, may have to be abandoned.

One procedure for removing the mud is merely to attempt to displace it with the cement slurry. However, as indicated, this is not always possible. It is desirable to achieve good mud removal ahead of the cement to improve bonding between the set cement, the borehole wall and the casing.

A limited attempt has been made to interpose a liquid spacer composition between a cement slurry and mud to improve mud displacement. The use of water or oil ahead of the cement slurry has been a common practice for many years. It is primarily thought of as a flushing agent and a means for physically separating the mud and the cement slurry. However, tests have shown that most of the partially dehydrated mud cake retained on the borehole wall cannot be removed under normal circulating conditions.

To be effective, the spacer composition should have the following characteristics. The spacer should be compatible with both a carbonaceous and aqueous media, that is, an oil-based drilling mud and an aqueous cement slurry and with any combination of the systems. This compatibility should also exist at the downhole temperatures and pressures. It is also desirable to leave these surfaces water wet so that the aqueous cement can firmly bond to the pipe and the formation. The liquid spacer also should be readily adaptable to a wide variety of oil-based muds and cement slurries. Likewise, the density of the spacer composition should be readily variable in order to match the densities of the fluids to be removed from a well and the like.

The present invention concerns a liquid spacer composition which successfully accomplishes most of the desired characteristics set forth above. It can also be employed as a spacer, for example, in pipe lines, between hydrocarbonaceous and nonhydrocarbonaceous fluids.

SUMMARY OF THE INVENTION

The present invention relates to an aqueous composition and method for substantially preventing contact between non-compatible fluids contained in a conduit, well bore or other container by employing the composition as a spacer.

The composition comprises an aqueous fluid, an admixture of nonylphenols ethoxylated with from 1 to 14 moles of ethylene oxide, and, preferably, at least one member selected from the group consisting of a sulfonated linear $C_8$ to $C_{18}$ straight chain alcohol ethoxylated with from 2 to 20 moles of ethylene oxide, a low molecular weight aliphatic glycol ether containing from about 3 to about 12 carbon atoms per molecule and an alcohol containing from 3 to 8 carbon atoms ethoxylated with 2 to 4 moles of ethylene oxide together with any conventionally utilized spacer additives, if desired, such as viscosifiers, weighting agents and the like.

DESCRIPTION OF THE PREFERRED EMBODIMENT

The spacer composition of the present invention is comprised of an aqueous fluid base. Generally, any aqueous fluid commonly employed in the preparation of cement may be utilized, such as for example, water, natural or artificial brines and the like.

An essential ingredient of the composition is an admixture of nonylphenols ethoxylated with an average of from about 1 to about 14 moles of ethylene oxide. The admixture of nonylphenols should comprise from about 0 to about 100 percent by volume nonylphenols ethoxylated with an average of from about 1 to 6 moles of ethylene oxide (E.O.) and from about 0 to about 100 percent nonylphenols ethoxylated with an average of from about 7 to about 14 moles of ethylene oxide. Preferably, the admixture of nonylphenols should comprise from about 20 to about 80 percent by volume nonylphenols ethoxylated with from about 1 to 6 moles of ethylene oxide and from about 20 to about 80 percent nonylphenols ethoxylated with from about 7 to about 14 moles of ethylene oxide. Most preferably, the admixture of nonylphenols should comprise from about 50 to about 80 percent by volume nonylphenols ethoxylated with from about 1 to 6 moles of ethylene oxide and from about 20 to about 50 percent nonylphenols ethoxylated with from about 7 to about 14 moles of ethylene oxide.

Another ingredient which may be present in the composition of the present invention is a sulfonated linear straight chain alcohol which is ethoxylated with an average of from about 2 to about 20 moles of ethylene oxide. The straight chain alcohol comprises a $C_8$ to $C_{18}$ alcohol having a degree of sulfonation of about 50 to about 100 percent. Preferably, the straight chain alcohol comprises a $C_{12}$ to $C_{16}$ alcohol having a degree of sulfonation of about 100 percent. Examples of such compounds are a $C_{12}$ to $C_{12}$ alkyl ethoxylate sulfate with an average of about 3 moles E.O., $C_{10}$ to $C_{12}$ alkyl ethoxylate sulfate with an average of less than about 6 moles E.O. and the like.

Another ingredient which may be present in the composition is a low molecular weight aliphatic glycol ether containing from about 3 to about 12 carbon atoms per molecule. Examples of such ethers include ethylene glycol monomethyl ether, ethylene glycol dimethyl ether, diethylene glycol dimethyl ether, ethylene glycol monoethyl ether, ethylene glycol diethyl ether, diethylene glycol diethyl ether, ethylene glycol monopropyl ether, ethylene glycol monobutyl ether, diethylene glycol n-butyl ether, propylene glycol monomethyl ether, propylene glycol dimethyl ether, propylene glycol monoethyl ether, dipropylene glycol dimethyl ether, tripropylene glycol monomethyl ether, and the like. Ethylene glycol monobutyl ether has been found to be particularly effective for purposes of the invention and therefore is preferred.

Yet another ingredient which may be present in the composition of the present invention is an alcohol containing from about 3 to about 8 carbon atoms ethoxylated with an average of from about 2 to about 4 moles of ethylene oxide. Preferably, the alcohols are ethoxylated with from about 2 to about 3 moles of ethylene oxide. Examples of such alcohols include n-propyl, isopropyl, n-butyl, isobutyl, sec-butyl, tert-butyl, n-pentyl, isopentryl, tert-pentyl, n-hexyl, n-heptyl, n-octyl alcohols, 2 methyl-1-butanol and the like.

The composition of the present invention may be prepared in any suitable mixing apparatus. Preferably, the composition is prepared a short period before its intended use. For example, the aqueous fluid, ethoxylated nonylphenol admixture, sulfonated linear alcohol, ether and alcohol admixture can be added to a blender and then agitated for a sufficient period of time to adequately mix the constituents. Conventional additives can be added to the blender and agitated to admix the constituents to form a homogenous fluid prior to addition of the composition of the present invention.

The constituents of the composition can be present in the following ranges:

|  | Percent by volume |
| --- | --- |
| ethoxylated nonylphenol admixture | about 1 to about 10 |
| ethoxylated alcohol | about 0 to about 5 |
| sulfonated linear alcohol | about 0 to about 5 |
| ether | about 0 to about 5 |
| aqueous | about 75 to about 98 |

Preferably, the constituents of the composition are present in the following ranges:

|  | Percent by volume |
| --- | --- |
| ethoxylated nonylphenol admixture | about 1.0 to about 7.5 |
| ethoxylated alcohol | about 0 to about 2.5 |
| sulfonated linear alcohol | about 0 to about 2.5 |
| ether | about 0 to about 2.5 |
| aqueous | about 85 to about 98 |

Typically, at least one member selected from the group of the ethoxylated alcohol, sulfonated linear alcohol and ether is present in addition to the ethoxylated nonylphenol admixture and aqueous fluid. Most preferably, all five constituents are present in the composition for most effective performance. In this instance, the constituents are present in the following ranges:

|  | Percent by volume |
| --- | --- |
| ethoxylated nonylphenol admixture | about 1.0 to about 7.5 |
| ethoxylated alcohol | about 0.1 to about 2.5 |
| sulfonated linear alcohol | about 0.1 to about 2.5 |
| ether | about 0.1 to about 2.5 |
| aqueous | about 85 to about 98 |

Optionally, a weighting agent can be admixed with the composition. When the composition is to be employed as a spacer between cement slurries and drilling muds, it is preferable, but not essential, that the composition have a density at least equal to or greater than the density of the drilling mud and less than or equal to the density of the cement slurry. Weighting agents that can be utilized are particulate substantially water and liquid hydrocarbon insoluble solids including, for example, sand, barite, hematite or other iron oxides, fly ash, other finely ground solids and the like. When the composition is employed as a spacer fluid in advance of a cement slurry, preferably, the weighting agent comprises barite. The weighting agent is employed in an amount sufficient to provide any desired composition density.

Optionally, a viscosifier can be admixed with the composition of the present invention to facilitate suspension of any solids contacted and admixed with the composition. The viscosifier can comprise, for example, substantially any of the conventionally utilized materials such as polysaccharides, for example guar and guar derivatives, cellulose derivatives, xanthan, clays such as bentonite, sepiolite, attapulgite and the like.

In removing mud from a borehole, typically, the liquid composition of this invention is pumped down the borehole and up through the annulus between the casing and the formation face to remove at least a portion the drilling mud therefrom. The liquid composition of this invention may be displaced down the casing and up through the annulus by the use of another liquid, but preferably, it is immediately followed by the aqueous cement slurry to be employed to cement the casing. The cement slurry then may be followed by an additional volume of the liquid composition.

Sufficient spacer is employed to separate the drilling mud from the cement slurry. As the spacer is circulated through the well bore, it will mix with oil-based mud and the cement slurry will mix with the spacer. Before the drilling mud is completely removed from the area to be cemented, there may be mixing of the drilling mud, spacer and cement slurry. However, the composition of the present invention will not harden, gelatinize or otherwise become immobile because of a commingling of the three components.

The composition of the present invention is compatible with solid-containing hydrocarbon based fluids such as drilling muds and the like, cement slurries, liquid hydrocarbons, brines and the like. The composition is stable at elevated temperatures, such as for example, at temperatures in the range of up to about 450° F. The density of the composition can be easily altered and the suspending characteristics of the composition is excellent even at high temperatures.

To further illustrate the present invention and not by way of limitation, the following examples are presented.

EXAMPLE I

Interfacial compatibility of fluids is unpredictable. Interfacial compatibility is indicated by the presence or absence of a marked increase in fluid viscosity after contacting of two fluids and the fluid admixtures' stability. A significant viscosity increase indicates the fluids are incompatible. Likewise, a nonhomogeneous fluid admixture also indicates the fluids are incompatible.

To illustrate the compatibility of the composition of the present invention with oil-based drilling muds, the following tests were performed. A quantity of the composition of the present invention together with conventional additives as hereafter defined is admixed with a sample of a drilling mud. The composition functions as a contaminant in the drilling mud. The proportion of the composition in the respective sample of drilling mud is set forth in the following tables. The sample is admixed by hand until it has a uniform consistency. The rheological properties of the fluid then are determined on a Model 35 Fann viscometer utilizing a standard bob and No. 1 spring.

TABLE I

| Oil-based drilling mud density: | 12.6 lb/gal |
|---|---|
| Spacer density: | 13 lb/gal |
| Constituents/bbl: | 310 lb silica flour |
| | 6.2 lb clay |
| | 1.6 lb carboxymethylhydroxyethylcellulose |
| | 1.6 lb naphthalene fulfonic acid condensed with formaldehyde - polyvinyl pyrrolidone admixture |
| | 6.5 lb sodium chloride |
| | 25.22 gal water |
| | 1.2 gal nonylphenol admixture |
| | 0.48 gal $C_{12}$–$C_{16}$ alkyl ethoxylate sulfate with average of 3 moles E.O. |
| | 0.3 gal ethylene glycol monobutyl ether |
| | 0.3 gal $C_6$ ethoxylated alcohol with average of 2 moles E.O. |

| Rheological Properties | | | | | | | |
|---|---|---|---|---|---|---|---|
| Temperature, (°F.) | 103 | 103 | 103 | 103 | 103 | 103 | 103 |
| Drilling mud/spacer ratio, % | mud | 95/5 | 75/25 | 50/50 | 25/75 | 5/95 | spacer |
| Apparent viscosity, cp | 61 | 70 | 94 | 56 | 49 | 60 | 41 |
| 600 rpm | 122 | 140 | 188 | 112 | 98 | 119 | 81 |
| 300 rpm | 67 | 76 | 114 | 65 | 59 | 71 | 46 |
| Plastic viscosity, cp | 55 | 64 | 74 | 47 | 39 | 48 | 35 |
| Yield point (lb/100 ft$^2$) | 12 | 12 | 40 | 18 | 20 | 23 | 11 |
| 200 rpm | 48 | 54 | 90 | 48 | 45 | 53 | 33 |
| 100 rpm | 28 | 31 | 57 | 30 | 29 | 34 | 20 |
| 6 rpm | 6 | 7 | 10 | 8 | 10 | 11 | 4 |
| 3 rpm | 5 | 5 | 7 | 6 | 9 | 10 | 3 |

TABLE II

| Oil-based drilling mud density: | 16.6 lb/gal |
|---|---|
| Spacer density: | 17 lb/gal |
| Constituents/bbl.: | 9 lb sand |
| | 10 lb diatomaceous earth |
| | 2.5 lb naphthalene sulfonic acid condensed with formaldehyde |
| | 459 lb barite |
| | 3.5 lb clay |
| | 24.97 gal water |
| | 1.06 gal $C_{12}$–$C_{16}$ alkyl ethoxylate sulfate with average of 3 moles E.O. |
| | 1.56 gal nonylphenol admixture |

| Rheological Properties | | | | | | | |
|---|---|---|---|---|---|---|---|
| Temperature, (°F.) | 120 | 120 | 120 | 120 | 120 | 120 | 120 |
| Drilling mud/spacer ratio, % | mud | 95/5 | 75/25 | 50/50 | 25/75 | 5/95 | spacer |
| Apparent viscosity, cp | 125 | 110 | 126 | 50 | 33 | 24 | 25 |
| 600 rpm | 250 | 219 | 251 | 100 | 66 | 47 | 50 |
| 300 rpm | 135 | 126 | 145 | 59 | 38 | 25 | 27 |
| Plastic viscosity, cp | 115 | 93 | 106 | 41 | 28 | 21 | 23 |

TABLE II-continued

| | | | | | | | |
|---|---|---|---|---|---|---|---|
| Yield point (lb/100 ft$^2$) | 20 | 33 | 39 | 18 | 10 | 5 | 4 |
| 200 rpm | 95 | 91 | 109 | 45 | 28 | 20 | 20 |
| 100 rpm | 54 | 54 | 64 | 29 | 18 | 14 | 13 |
| 6 rpm | 12 | 11 | 15 | 12 | 10 | 10 | 5 |
| 3 rpm | 11 | 9 | 12 | 12 | 10 | 10 | 5 |

TABLE III

| | |
|---|---|
| Oil-based drilling mud density: | 17.5 lb/gal |
| Spacer density: | 18.0 lb/gal |
| Constituents/bbl: | 6.4 lb sand |
| | 8.0 lb diatomaceous earth |
| | 2.0 lb naphthalene sulfonic acid condensed with formaldehyde |
| | 518.0 lb barite |
| | 2.8 lb clay |
| | 22.84 gal water |
| | 1.68 gal $C_{12}$–$C_{16}$ alkyl ethoxylate sulfate with average of 3 moles E.O. |
| | 0.84 gal nonylphenol admixture |
| | 0.42 gal ethylene glycol monobutyl ether |
| | 0.42 gal $C_6$ ethoxylated alcohol with average of 2 moles E.O. |

Rheological Properties

| | | | | | | | |
|---|---|---|---|---|---|---|---|
| Temperature, (°F.) | 120 | 120 | 120 | 120 | 120 | 120 | 120 |
| Drilling mud/spacer ratio, % | mud | 95/5 | 75/25 | 50/50 | 25/75 | 5/95 | spacer |
| Apparent viscosity, cp | 66 | 89 | 110 | 49 | 37 | 24 | 23 |
| 600 rpm | 132 | 177 | 220 | 97 | 74 | 47 | 46 |
| 300 rpm | 73 | 97 | 120 | 55 | 40 | 25 | 24 |
| Plastic viscosity, cp | 59 | 80 | 100 | 42 | 34 | 22 | 22 |
| Yield point (lb/100 ft$^2$) | 14 | 17 | 20 | 13 | 6 | 3 | 2 |
| 200 rpm | 53 | 70 | 88 | 41 | 28 | 18 | 17 |
| 100 rpm | 33 | 41 | 52 | 25 | 16 | 12 | 11 |
| 6 rpm | 9 | 9 | 9 | 5 | 3 | 7 | 5 |
| 3 rpm | 8 | 7 | 7 | 4 | 3 | 7 | 4 |

TABLE IV

| | |
|---|---|
| Oil-based drilling mud density: | 18.7 lb/gal |
| Spacer density: | 19.0 lb/gal |
| Constituents/bbl: | 5.4 lb sand |
| | 6.0 lb diatomaceous earth |
| | 1.5 lb naphthalene sulfonic acid condensed with formaldehyde |
| | 576.0 lb barite |
| | 2.7 lb clay |
| | 22.04 gal water |
| | 1.68 gal $C_{12}$–$C_{16}$ alkyl ethoxylate sulfate with average of 3 moles E.O. |
| | 0.25 gal nonylphenol admixture |
| | 0.42 gal ethylene glycol monobutyl ether |
| | 0.42 gal $C_6$ ethoxylated alcohol with average of 2 moles E.O. |

Rheological Properties

| | | | | | | | |
|---|---|---|---|---|---|---|---|
| Temperature, (°F.) | 120 | 120 | 120 | 120 | 120 | 120 | 120 |
| Drilling mud/spacer ratio, % | mud | 95/5 | 75/25 | 50/50 | 25/75 | 5/95 | spacer |

TABLE IV-continued

| | | | | | | | |
|---|---|---|---|---|---|---|---|
| Apparent viscosity, cp | 59 | 73 | 87 | 49 | 42 | 38 | 28 |
| 600 rpm | 118 | 146 | 174 | 98 | 83 | 76 | 55 |
| 300 rpm | 62 | 81 | 88 | 48 | 46 | 42 | 30 |
| Plastic viscosity, cp | 56 | 65 | 86 | 50 | 37 | 34 | 25 |
| Yield point (lb/100 ft$^2$) | 6 | 16 | 2 | 0 | 9 | 8 | 5 |
| 200 rpm | 44 | 58 | 58 | 34 | 35 | 31 | 23 |
| 100 rpm | 25 | 34 | 31 | 19 | 24 | 20 | 15 |
| 6 rpm | 5 | 8 | 6 | 4 | 14 | 9 | 8 |
| 3 rpm | 4 | 7 | 5 | 3 | 13 | 8 | 8 |

The foregoing data accompanied by visual observations show that the water-based spacer of the present invention is capable of forming a compatible mixture with a drilling fluid which is both pumpable and remains homogeneous.

EXAMPLE II

The procedure set forth in Example I is repeated utilizing a cement slurry in place of the drilling mud to evaluate fluid compatibility.

TABLE V

| | |
|---|---|
| Cement slurry density: | 13.9 lb/gal |
| Constituents: | 94.0 lb class H cement |
| | 7.5 lb clay per 94 lb cement |
| | 0.94 lb retarder per 94 lb cement |
| | 8.5 gal water per 94 lb cement |
| Spacer density: | 13.0 lb/gal |
| Constituents/bbl: | 310.0 lb silica flour |
| | 6.2 lb clay |
| | 1.6 lb carboxymethylhydroxyethylcellulose |
| | 1.6 lb naphthalene sulfonic acid condensed with formaldehyde - polyvinyl pyrrolidone admixture |
| | 6.5 lb sodium chloride |
| | 25.22 gal water |
| | 1.2 gal nonylphenol admixture |
| | 0.48 gal $C_{12}$-$C_{16}$ alkyl ethoxylate sulfate with average of 3 moles E.O. |
| | 0.3 gal ethylene glycol monobutyl ether |
| | 0.3 gal $C_6$ ethoxylated alcohol with average of 2 moles E.O. |

Rheological Properties

| | | | | | | | |
|---|---|---|---|---|---|---|---|
| Temperature, (°F.) | 72 | 72 | 72 | 72 | 72 | 72 | 72 |
| Cement/spacer ratio, % | cement | 95/5 | 75/25 | 50/50 | 25/75 | 5/95 | spacer |
| Apparent viscosity, cp | 65 | 68 | 61 | 63 | 60 | 60 | 63 |
| 600 rpm | 130 | 136 | 121 | 126 | 119 | 120 | 125 |
| 300 rpm | 74 | 81 | 68 | 68 | 60 | 60 | 64 |
| Plastic viscosity, cp | 56 | 55 | 53 | 58 | 59 | 60 | 61 |
| Yield point (lb/100 ft$^2$) | 18 | 26 | 15 | 10 | 1 | 0 | 3 |
| 200 rpm | 53 | 60 | 48 | 47 | 41 | 40 | 43 |
| 100 rpm | 30 | 38 | 28 | 27 | 22 | 21 | 23 |
| 6 rpm | 5 | 18 | 8 | 6 | 3 | 3 | 4 |
| 3 rpm | 4 | 18 | 8 | 6 | 2 | 2 | 3 |

TABLE VI

| | |
|---|---|
| Cement slurry density: | 17.1 lb/gal |
| Constituents: | 94 lb class H cement |
| | 32.9 lb Oklahoma No. 1 sand per 94 lb cement |
| | 0.47 lb naphthalene sulfonic acid condensed with formaldehyde - polyvinyl pyrrolidone admixture |
| | 0.37 lb carboxymethylhydroxyethylcellulose |
| | 0.32 lb retarder per 94 lb cement |
| | 12.5 lb hematite per 94 lb cement |
| | 4.5 gal water per 94 lb cement |
| Spacer density: | 16 lb/gal |
| Constituents/bbl: | 189 lb silica flour |
| | 268 lb barite |
| | 2.3 lb clay |
| | 1.4 lb carboxymethylhydroxy- |

TABLE VI-continued ethylcellulose
2.3 lb naphthalene sulfonic acid condensed with formaldehyde - polyvinyl pyrrolidone admixture
23.28 gal water
1.08 gal $C_{12}$-$C_{16}$ alkyl ethoxylate sulfate with average of three moles E.O.
0.48 gal nonylphenol admixture
0.48 gal ethylene glycol monobutyl ether
0.48 gal $C_6$ ethoxylated alcohol with average of 2 moles E.O.

Rheological Properties

| | | | | | | | |
|---|---|---|---|---|---|---|---|
| Temperature, (°F.) | 72 | 72 | 72 | 72 | 72 | 72 | 72 |
| Cement/spacer ratio, % | cement | 95/5 | 75/25 | 50/50 | 25/75 | 5/95 | spacer |
| Apparent viscosity, cp | 55 | 64 | 76 | 87 | 130 | 214 | 252 |
| 600 rpm | 109 | 127 | 152 | 174 | 260 | 428 | 504 |
| 300 rpm | 55 | 71 | 83 | 98 | 146 | 236 | 286 |
| Plastic viscosity, cp | 54 | 56 | 69 | 76 | 114 | 192 | 218 |
| Yield point (lb/100 ft$^2$) | 1 | 15 | 14 | 22 | 32 | 44 | 68 |
| 200 rpm | 38 | 51 | 58 | 66 | 102 | 162 | 206 |
| 100 rpm | 20 | 29 | 32 | 34 | 54 | 86 | 110 |
| 6 rpm | 2 | 4 | 4 | 4 | 4 | 8 | 12 |
| 3 rpm | 2 | 3 | 2 | 2 | 4 | 4 | 8 |

The foregoing data accompanied by visual observations show that the water-based spacer of the present invention is capable of forming a compatible mixture with a cement slurry which is both pumpable and remains homogenous.

EXAMPLE III

In this example, a field job utilizing the spacer composition of the present invention was conducted. A 2,250 foot liner was set to a total depth of 11,100 feet. A 16.4 lb/gal invert emulsion mud was used for drilling. The liner was 5 inches in diameter and was set in a 6.5 inch open hole. The cement slurry was Class H cement containing 35 percent, by weight, coarse sand, 0.75 percent of an admixture of napthalene sulfonic acid condensed with formaldehyde and polyvinyl pyrrolidone, 0.6 percent retarder, 0.25 percent defoamer and 4.5 gal water per sack of cement. The cement had a density of 17.2 lbs/gal and a volume of 1.28 ft$^3$/sack of cement. A quantity of the spacer composition of the present invention in an amount sufficient to provide 1,000 linear annular feet in the annulus was used ahead of the cement. The composition was similar to that of the previous examples and was prepared in a blender as described hereinbefore. The spacer had a density of 17.0 lbs/gal and comprised (per barrel) 460 lbs barite, 2.5 lbs naphthalene sulfonic acid condensed with formaldehyde, 10 lbs diatomaceous earth, 3.5 lbs clay, 9 lbs sand, 25.2 gal water, 1 gal $C_{12}$-$C_{16}$ alkyl ethoxylate sulfate with average of 3 moles E.O., 0.1 gal ethylene glycol monobutyl ether, 0.1 gal $C_6$ ethoxylated alcohol with average of 2 moles E.O. and 0.85 gal nonylphenol admixture. The spacer composition was introduced down the liner and returned up the annulus between the liner and borehole. The cement slurry was introduced immediately after the spacer composition. No problems occurred during the mixing, pumping and displacement of the spacer composition or cement slurry as indicated by a pressure history maintained during the job which showed no undesirable gelation occurred during the displacement procedures.

While that which presently is considered to be the preferred embodiment of the present invention has been described herein, it is to be understood that changes and modifications can be made in the composition and method by an individual skilled in the art without departing from the spirit or scope of the invention as set forth in the following claims:

What is claimed is:

1. A method of emplacing an aqueous cement slurry into a well bore which contains an oil base composition having dispersed therein oil wet particles, which comprises:
   introducing into said well bore and into contact with said oil based composition, a spacer composition comprising:
   an aqueous fluid;
   a nonylphenol admixture comprising from about 20 to about 80 percent by volume nonylphenols ethoxylated with from about 1 to about 6 moles of ethylene oxide and from about 20 to about 80 percent by volume nonylphenols ethoxylated with from about 7 to about 14 moles of ethylene oxide, present in an amount of from about 1 to about 10 percent by volume of said composition; and,
   at least one member selected from the group consisting of:
   a sulfonated linear $C_8$ to $C_{18}$ straight chain alcohol ethoxylated with from 2 to 20 moles of ethylene oxide;
   an aliphatic glycol ether containing from about 3 to about 12 carbon atoms, and
   an alcohol containing from about 3 to about 8 carbon atoms ethoxylated with from about 2 to about 4 moles of ethylene oxide, said alcohol being different from said aliphatic glycol when present, said selected member being individually present in an amount of from about 0 to about 5 percent by volume of said composition;

displacing at least a portion of said oil based composition from an area in said well bore into which said cement slurry is to be emplaced with said spacer composition;

displacing at least a portion of said spacer composition from said area in said well bore into which an aqueous cement slurry is to be emplaced with said cement slurry; and permitting said cement slurry to set up in said area.

2. The method of claim 1 wherein said nonylphenol admixture comprises from about 50 to about 80 percent by volume nonylphenols ethoxylated with from about 1 to about 6 moles of ethylene oxide and from about 20 to about 50 percent by volume nonylphenols ethoxylated with from about 7 to about 14 moles of ethylene oxide.

3. The method of claim 1 wherein said nonylphenol admixture is present in an amount of from about 1 to about 7.5 percent by volume of said composition and said sulfonated linear straight chain alcohol, aliphatic glycol ether and ethoxylated $C_3$ to $C_8$ alcohol are each present in an amount of from about 0.1 to about 2.5 percent by volume of said composition.

4. The method of claim 1 wherein said spacer composition is defined further to include a weighting agent.

5. The method of claim 4 wherein said weighting agent is present in an amount sufficient to provide a density to said spacer composition which is at least equal to or greater than the value of the densitiy of said oil based composition.

6. The method of claim 4 wherein said weighting agent comprises at least one member selected from the group consisting of sand, barite, iron oxides and fly ash.

7. The method of claim 1 wherein said spacer composition is defined further to include a viscosifying agent.

8. The method of claim 7 wherein said viscosifying agent comprises at least one member selected from the group consisting of guar, guar derivatives, cellulose derivatives, xanthan and clay.

9. The method of claim 1 wherein said member selected from the group of sulfonated linear alcohols, glycol ethers and ethoxylated alcohols is individually present in an amount of in excess of about 0 to about 5 percent by volume of said composition.

10. A method of cementing an area of a borehole penetrating a subterranean formation in which a casing is present, said borehole containing in said area to be cemented an oil based drilling mud, which comprises:

introducing a spacer composition comprising:
an aqueous fluid,
a nonylphenol admixture comprising from about 20 to about 80 percent by volume nonylphenols ethoxylated with from about 1 to about 6 moles of ethylene oxide and from about 20 to about 80 percent by volume nonylphenols ethoxylated with from about 7 to about 14 moles of ethylene oxide, present in an amount of from about 1 to about 10 percent by volume of said composition; and, at least one member selected from the group consisting of:
a sulfonated linear $C_8$ to $C_{18}$ straight chain alcohol ethoxylated with from 2 to 20 moles of ethylene oxide;
an aliphatic glycol ether containing from about 3 to about 12 carbon atoms, and
an alcohol containing from about 3 to about 8 carbon atoms ethoxylated with from about 2 to about 4 moles of ethylene oxide, said alcohol being different from said aliphatic glycol when present, said selected member being individually present in an amount of from about 0 to about 5 percent by volume of said composition; into said borehole in a quantity sufficient to displace at least a portion of said drilling mud from the area to be cemented, introducing an aqueous cement slurry into said borehole to displace at least a portion of said spacer composition from the area to be cemented and place said cement slurry into said area; and, permitting said cement slurry to set up in said area to be cemented.

11. The method of claim 10 wherein said nonylphenol admixture comprises from about 50 to about 80 percent by volume nonylphenols ethoxylated with from about 1 to about 6 moles of ethylene oxide and from about 20 to about 50 percent by volume nonylphenols ethoxylated with from about 7 to about 14 moles of ethylene oxide.

12. The method of claim 10 wherein said nonylphenol admixture is present in an amount of from about 1 to about 7.5 percent by volume of said composition and said sulfonated linear straight chain alcohol, aliphatic glycol ether and ethoxylated $C_3$ to $C_8$ alcohol are each present in an amount of from about 0 to about 2.5 percent by volume of said composition.

13. The method of claim 10 wherein said spacer composition is defined further to include a weighting agent.

14. The method of claim 13 wherein said weighting agent is present in an amount sufficient to provide a density to said spacer composition which is at least equal to or greater than the value of the density of said oil based composition.

15. The method of claim 10 wherein said spacer composition is defined further to include a viscosifying agent comprising at least one member selected from the group consisting of guar, guar derivatives, cellulose derivatives, xanthan and clay.

16. The method of claim 10 wherein said member selected from the group of sulfonated linear alcohols, glycol ethers and ethoxylated alcohols is individually present in an amount of in excess of about 0 to about 5 percent by volume of said composition.

* * * * *